M. GUETT.
ELECTRIC CABLE CLAMP.
APPLICATION FILED APR. 24, 1913.
1,225,125.
Patented May 8, 1917.
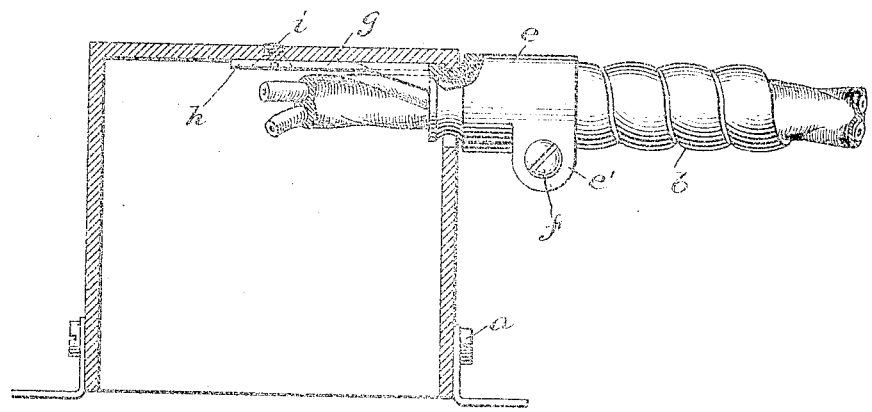
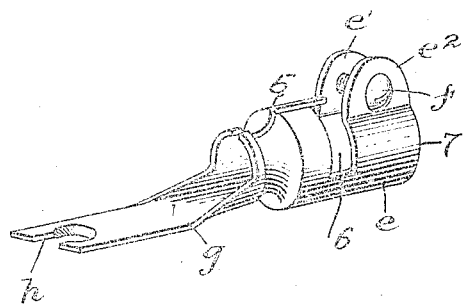
Witnesses
Marie E. Meyer
[signature]
Inventor
Monroe Guett
by [signature]
Atty.

UNITED STATES PATENT OFFICE.

MONROE GUETT, OF HARTFORD, CONNECTICUT, ASSIGNOR TO THE HART & HEGEMAN MANUFACTURING COMPANY, OF HARTFORD, CONNECTICUT, A CORPORATION OF CONNECTICUT.

ELECTRIC-CABLE CLAMP.

1,225,125.

Specification of Letters Patent. Patented May 8, 1917.

Application filed April 24, 1913. Serial No. 763,272.

*To all whom it may concern:*

Be it known that I, MONROE GUETT, a citizen of the United States, and a resident of Hartford, in the county of Hartford and State of Connecticut, have invented certain new and useful Improvements in Electric-Cable Clamps, of which the following is a specification.

The invention relates to that class of devices used for securing the end of a cable within a receptacle such as a wall casing, in which an electric switch or some similar mechanism is to be installed, and has for its object to provide a device of the character described having features of novelty and advantage.

In the drawings, Figure 1 is a side view showing the manner of use of a clamp made in accordance with my invention, the parts being broken away to show construction.

Fig. 2 is a perspective view of the clamp.

Referring to the drawings, $a$ denotes a receptacle such as a metal wall case, adapted to receive and support a switch; $b$ denotes the cable which usually has a metallic armor. The wall of the receptacle is apertured to permit passing the cable into the receptacle so that its ends may be connected with the terminals of the switch. The clamp secures the cable to the casing, removing strain from the attachment of the cable to the switch terminals, and in the case of the metal armored cable it constitutes a ground connection with the receptacle, a thing required by the insurance underwriters.

The new clamp constituting the subject matter of this invention, which is preferably formed up to shape from a single piece of sheet metal stock, is made as follows: The tubular body $e$ is longitudinally slotted as at 5 to give it a slight spring action, and partly circumferentially slotted as at 6, to produce a sufficient spring action in the clamp portion 7 which is comprised of the upstanding ears $e'$ and $e^2$ engaged by the screw $f$, by which the clamp is bound onto the cable armor. It will be observed from Fig. 1 that the slot 6 does not extend entirely around so as to make the clamp a separate piece from the body portion, but extends only partly around and to an extent sufficient to permit proper movement of the upstanding ears $e'$ and $e^2$. At its forward end the tubular body is spun down to provide a reduced neck having a curved surface to engage the bare cable in a way to avoid cutting through the insulation.

Projecting from the front of the tubular body $e$ preferably at that side which is opposite to the longitudinal slot 5, is a substantially flat longitudinal extension $g$ with its end notched and apertured as at $h$ to receive a securing screw $i$, which, as will be seen by reference to Fig. 1, is mounted in the rear wall of the case or in a wall adjacent to the apertured wall through which the clamp extends. As a result of this construction it will be seen that the clamp is securely fastened to the case; that the fastening device, namely, the screw $i$, is in an extremely accessible position where it can be operated by a screw-driver; and that this arrangement necessitates the securing of the clamp to a wall of the case other than the apertured wall through which the clamp is introduced. In this respect it greatly facilitates the connection of the wires with the switch terminals and the securing of the clamp to the case.

The mechanism, such as an electric switch, which is supported within the case has not been illustrated, since it may vary in type or kind. Obviously, the shape and character of the wall case or receptacle may vary, the utility of the clamp for the purposes specified being not affected by such changes.

I claim as my invention:—

As a new article of manufacture a cable clamp formed up to shape from a single piece of sheet metal, and comprising at one end a tubular part so formed as to leave a longitudinal slot, and at the other end a flat longitudinally extending arm, the outer end of the tubular portion having screw-receiving apertures and slotted circumferentially for a short distance to provide an elastic clamp for engagement with a cable armor, the tubular portion near its inner end being provided with an inwardly projecting circumferential bead with a smooth rounding surface for engagement with the unarmored cable without cutting the insulation, the end of the arm having a key slot to permit of its being slid under the head of a clamping member.

MONROE GUETT.

Witnesses:
A. J. BENNETT,
ROY M. OLES.